United States Patent [19]
Lenane

[11] 3,815,338
[45] June 11, 1974

[54] EXHAUST SYSTEM
[75] Inventor: Denis L. Lenane, Ferndale, Mich.
[73] Assignee: Ethyl Corporation, Richmond, Va.
[22] Filed: Mar. 20, 1973
[21] Appl. No.: 343,103

Related U.S. Application Data
[63] Continuation-in-part of Ser. No. 265,699, June 23, 1972, which is a continuation-in-part of Ser. No. 879,043, Nov. 24, 1969, Pat. No. 3,688,476.

[52] U.S. Cl............. 55/276, 55/337, 55/459, 55/498, 55/DIG. 30, 55/527, 55/528, 60/311
[51] Int. Cl............................. B01d 50/00
[58] Field of Search............ 55/337, 276, 459, 498, 55/527, 529; 60/311; 181/50, 66

[56] References Cited
UNITED STATES PATENTS
3,162,518  12/1964  Thomas et al.............. 55/459
3,688,476  9/1972  Lenane................... 55/276

*Primary Examiner*—Bernard Nozick
*Attorney, Agent, or Firm*—Donald L. Johnson; Robert A. Linn; Joseph D. Odenweller

[57] ABSTRACT

Disclosed herein is a system for removing particulates from engine exhaust comprising an inertial particulate trap having a cylindrical cyclone chamber with a non-perforate bottom, slots in the side wall proximate to the bottom, a guide vane in the inlet compartment forming a generally circular tunnel leading to the entrance of the cyclone chamber and a pervious exhaust conditioning material (e.g., expanded metal lath) in the tunnel. Also disclosed is an exhaust gas filter used in combination with the trap.

15 Claims, 5 Drawing Figures

PATENTED JUN 11 1974 3,815,338

EXHAUST SYSTEM

PRIOR APPLICATIONS

This application is a continuation-in-part of application Ser. No. 265,699, filed June 23, 1972, which in turn is a continuation-in-part of application Ser. No. 879,043, filed Nov. 24, 1969, now U.S. Pat. No. 3,688,476.

BACKGROUND

Methods have been disclosed for removal of particulate matter from exhaust gas of internal combustion engines. These particulates are formed during combustion of the fuel and contain carbonaceous material and other combustion products of additives conventionally used in such fuel. Previous methods for removing such particulates are disclosed in U.S. Pat. Nos. 3,564,843; 3,545,179; 3,485,593; 3,426,513; 3,421,315; 3,397,034; 3,253,400; 3,197,955; 3,162,518; 3,154,389; 3,132,473; 3,100,146 and 3,056,662.

SUMMARY

According to the present invention, a particulate trap is provided having a cylindrical cyclone housing with reject slots in the side wall in the zone proximate to but not abutting a non-perforate bottom closure. The entrance compartment adjoining the cyclone chamber contains a generally circular guide vane which directs the incoming gas through a generally circular tunnel from a tangential inlet to the entrance of the cyclone chamber. The tunnel contains a pervious material having a high surface to volume ratio such as pieces of expanded metal lath. Downstream from the trap is a filter unit which removes residual particles which escape the trap.

DESCRIPTION OF THE PREFERRED EMBODIMENTS

Figure 1:
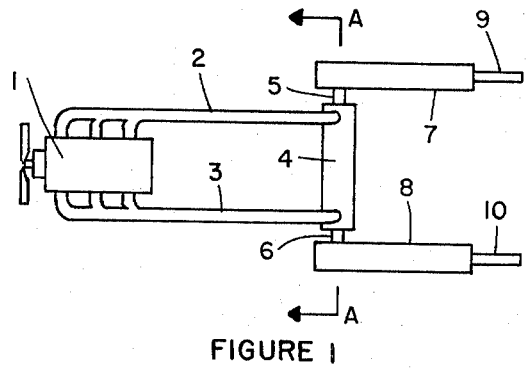
FIG. 1 is a schematic showing an engine equipped with an exhaust system of this invention.

Referring to FIG. 1, engine 1 is connected by exhaust pipes 2 and 3 to particulate trap 4. Trap 4 connects through conduits 5 and 6 to filter units 7 and 8 which exhaust to the atmosphere through tail pipes 9 and 10.

Figure 2:
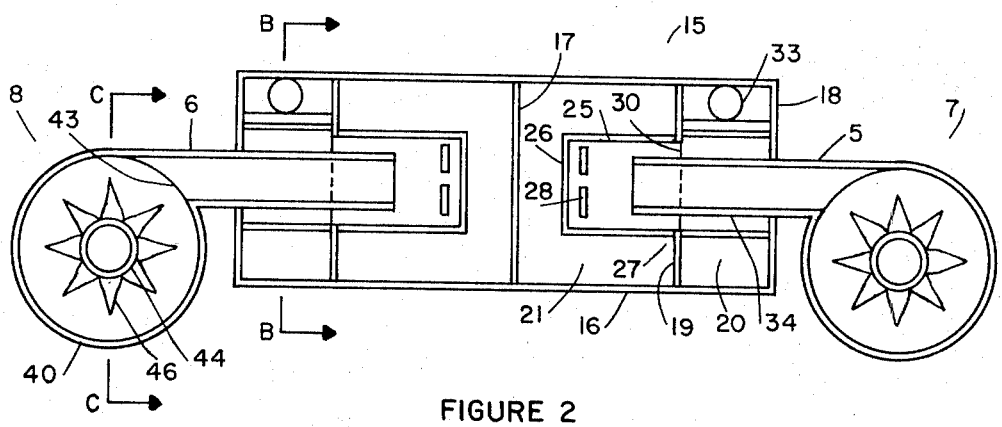
FIG. 2 is a longitudinal cross-section of a dual-trap version of the particulate trap and a transverse cross-section of the filter units taken at AA.

Referring to FIG. 2, it is seen that there are two mirror image trap units, only one of which will be described since they are constructed in the same manner. Trap housing 15 is formed by cylindrical side wall 16 and end closures 17 and 18. Housing 15 is divided by partition member 19 into inlet compartment 20 and trap compartment 21. Located within trap compartment 21 is cylindrical cyclone housing 25 which has a non-perforate closure 26 at one end and is sealably axially attached to partition member 19 at its other end 27. The optimum diameter of cyclone housing 25 can be readily determined from the rate of gas to be processed. A suitable diameter is about 2–3 inches for a standard size automobile engine. Located around the circumference of cyclone housing 25 proximate to but not abutting end closure 26 are a series of slots 28. These slots are generally spaced about ¼ to one inch from the bottom closure. Excellent results have been obtained using a 3 inch diameter cyclone housing with slots spaced ½ inch from the bottom closure. The circular opening 30 in partition member 19 connects the inside of cyclone housing 25 with inlet compartment 20.

Figure 3:
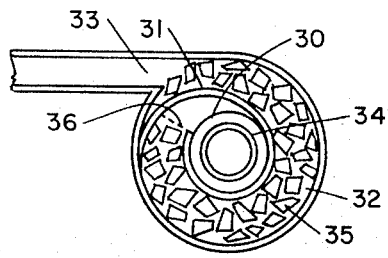
FIG. 3 is a transverse cross-section of the inlet compartment of the particulate trap taken at BB.

As shown more clearly in FIG. 3, generally circular vane member 31 forms a circular flow tunnel 32 leading from tangential inlet port 33 to opening 30 in partition member 19. Located within tunnel 32 are many small pieces of expanded sheet metal lath 35, which is the type material commonly used in the plaster industry as lath to which plaster adheres. Other materials having a high surface to volume ratio may be used such as wire mesh, marble chips, alumina, nails, metal borings, and the like. Exit tube 34 extends through end closure 18 axially into cyclone housing 25. Screen 36 prevents the metal lath from entering opening 30.

Figure 3A:
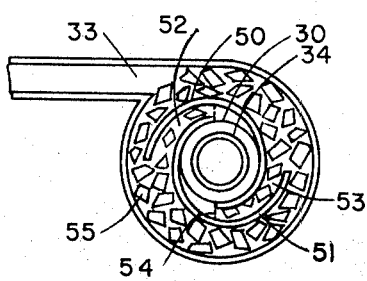
FIG. 3A is a transverse cross-section of an alternate arrangement of the vanes in the inlet compartment.
Figure 4:
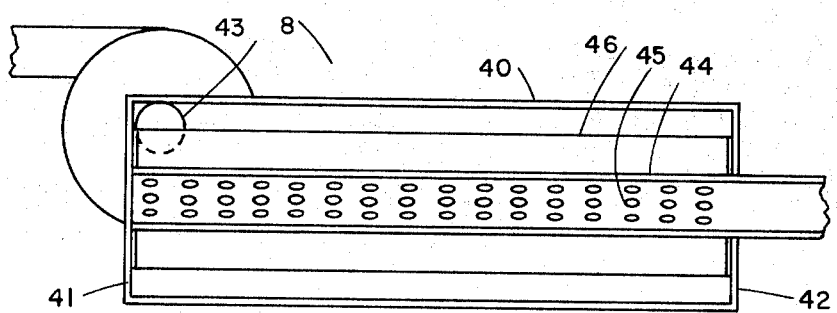
FIG. 4 is a longitudinal cross-section of the filter unit taken at CC.

FIG. 3A shows an alternate construction of inlet compartment 20. Curved vane members 50 and 51 form generally circular flow tunnels 52 and 53 leading from the peripheral area of inlet compartment 20 to opening 34. Flow tunnels 52 and 53 are filled with an exhaust conditioning agent as above such as expanded sheet metal lath 55.

Conduits 5 and 6 connect the two trap units to exhaust gas filters 7 and 8, only one of which, 8, will be described since they are constructed in the same manner. The filter unit is formed by a filter housing formed by side wall 40 and end closures 41 and 42. Located at one end of side wall 40 is tangential inlet 43. Extending axially through end closure 42 is exhaust tube 44, which is perforated 45 within filter 8. Cylindrical pleated filter element 46 is fitted around exhaust tube 44 and sealed at its ends to prevent exhaust leakage past the filter.

Filter element 46 is made o a filter material that can withstand the temperature of the hot exhaust gas, which is in the range of 400° to 1,000°F. For example, it can be made of a non-woven glass fiber mat or a glass paper. Porosity of the mat or paper may be adjusted by filling with glass microfibers of asbestos. Exceptionally good results have been obtained using a high melting point aromatic polyamide such as poly(m-phenylene-isophthalamide) non-woven fiber mat sewn or needled to a coarse fabric scrim or metal screen. Preferably, a non-woven mat is needled to a metal screen. This is done by inserting a multitude of small barbed needles through the screen and the fiber mat and pulling them back through the screen and then repeating the process many times. In this manner, a multitude of fibers are pulled through the openings in the screen and become entangled, firmly bonding the fiber mat to the screen. The screen with the fiber mat bonded to it is then pleated and formed into a cylindrical filter element.

In a most preferred embodiment the filter element is a non-woven poly(m-phenylene-isophthalamide) fiber mat needled to both surfaces of a metal screen or mesh to form a sandwich structured filter element.

In operation, exhaust gas containing particulate material is emitted by engine 1 and conducted by exhaust pipes 2 and 3 to particulate trap 4. Trap 4 is a dual unit and the operation of only one side will be described since both sides function in the same manner. Exhaust gas enters trap housing 15 tangentially at inlet 33 and is conducted through tunnel 32 wherein it contacts a large amount of expanded metal lath which serves to condition the exhaust to permit more efficient particulate removal. The exhaust then passes through opening 30 and spirals into cyclone housing 25. Upon encountering non-perforate bottom 26, the spiraling gas reverses direction and passes out through exit tube 34. Particulate matter is ejected through slots 28 into trap compartment 21, which can be filled with a high surface to volume ratio pervious material such as wire mesh to prevent re-entrainment. The gas leaving through exit tube 34 is conducted by conduit 6 into filter unit 8. It enters filter unit 8 at inlet 43 and passes through filter element 46 and perforations 45 into exhaust tube 44. From here, the clean exhaust is released to the atmosphere.

I claim:

1. A particulate trap for removing particulate matter from the exhaust gas of an internal combustion engine, said trap comprising a side wall and end closures forming a trap housing, a transverse partition member in said housing dividing said housing into an inlet compartment and a trap compartment, a cylindrical cyclone housing closed at one end located within said trap compartment and having its open end sealably attached to said partition member and having slots around the circumference of said cyclone housing, said slots being proximate to but not abutting said closed end, said partition member having a circular opening within the confines of said cylindrical cyclone housing connecting said inlet compartment with the inside of said cyclone housing, an exit tube extending through the end closure of said trap housing through said inlet compartment and axially into said cyclone housing, an inlet port into said inlet compartment adapted to connect to an engine exhaust system, a generally circular vane member within said inlet compartment forming a generally circular flow tunnel leading from said inlet port to said circular opening in said partition and wherein said tunnel contains a pervious exhaust gas conditioning material having a high surface to volume ratio.

2. An exhaust system for an internal combustion engine, said system comprising a particulate trap of claim 1 operatively connected to the exhaust outlet of said internal combustion engine.

3. A particulate trap of claim 1 wherein said exhaust conditioning material is a pervious mass of metal bodies having a high surface to volume ratio.

4. A particulate trap of claim 3 wherein said conditioning material is expanded sheet metal.

5. A particulate trap of claim 3 wherein said inlet port into said inlet compartment is a tangential inlet port.

6. A particulate trap of claim 5 wherein said exhaust conditioning material is expanded sheet metal.

7. An exhaust system for an internal combustion engine, said system comprising a particulate trap of claim 1 and an exhaust gas filter, said inlet port of said particulate trap being operatively connected to the exhaust outlet of said engine, said exit tube being operatively connected to the inlet of said exhaust gas filter, said exhaust gas filter comprising a filter housing formed by a side wall and end closures, an inlet to and outlet from said filter housing, and a filter element disposed within said filter housing such that exhaust passing from said inlet to said outlet passes through said filter element.

8. An exhaust system of claim 7 wherein said filter element is a non-woven poly(m-phenyleneisophthalamide) fiber mat.

9. An exhaust system of claim 7 wherein said filter element is a non-woven glass fiber mat.

10. An exhaust system of claim 7 wherein said filter element is a glass paper.

11. An exhaust system of claim 7 wherein said exhaust gas filter comprises a filter housing formed by a side wall and end closures, a centrally located exhaust tube extending longitudinally through said filter housing and out through one of said end closures, said exhaust tube being closed at the end within said filter housing and having perforations in the side wall within said filter housing, and a cylindrical pleated filter element fitted around said exhaust tube.

12. An exhaust system of claim 10 wherein said inlet to said filter housing is a tangential inlet in said side wall of said filter housing proximate to the end closure not having said exhaust tube extending through it.

13. An exhaust system of claim 10 wherein said filter element is a non-woven poly(m-phenyleneisophthalamide) fiber mat.

14. An exhaust system of claim 10 wherein said filter element is a glass fiber mat.

15. An exhaust system of claim 10 wherein said filter element is glass paper.

* * * * *

PO-1050
(5/69)

UNITED STATES PATENT OFFICE
CERTIFICATE OF CORRECTION

Patent No. 3,815,338  Dated June 11, 1974

Inventor(s) Denis L. Lenane

It is certified that error appears in the above-identified patent and that said Letters Patent are hereby corrected as shown below:

Column 4, Claim 12, line 1, "10" should read -- 11 --; Claim 13, line 1, "10" should read -- 11 --; Claim 14, line 1, "10" should read -- 11 --; Claim 15, line 1, "10" should read -- 11 --.

Signed and sealed this 17th day of September 1974.

(SEAL)
Attest:

McCOY M. GIBSON JR.         C. MARSHALL DANN
Attesting Officer           Commissioner of Patents